Patented Nov. 25, 1924.

1,516,566

UNITED STATES PATENT OFFICE.

HENRY L. HASKELL, OF LUDINGTON, MICHIGAN, ASSIGNOR TO HASKELITE MANUFACTURING CORPORATION, OF GRAND RAPIDS, MICHIGAN, A CORPORATION OF MICHIGAN.

LAMINATED MATERIAL AND THE PROCESS OF PREPARING SAME.

No Drawing. Continuation in part of application Serial No. 191,154, filed September 13, 1917. This application filed January 26, 1918, Serial No. 213,891. Renewed December 14, 1923.

*To all whom it may concern:*

Be it known that I, HENRY L. HASKELL, a citizen of the United States, residing at Ludington, Michigan, have invented certain new and useful Improvements in Laminated Material and the Process of Preparing Same, of which the following is a specification.

This application is a continuation in part of application Serial No. 191,154, filed September 13, 1917, with certain modifications and corrections of details.

This invention relates to an improved laminated material and the process of preparing the same, the invention being particularly applicable to laminated wood material.

The objects of this invention are to provide a veneer or other laminated material having a cement material for retaining the laminations together which shall resist the action of the elements and which shall be capable of properly molding and conforming to produce such articles as canoes or boats, the bodies and wings of aeroplanes, automobile bodies, and any other structures in which a light, strong, laminated material is desired.

Further objects, and objects relating to details, will definitely appear from the detailed description to follow.

The waterproof cementing material I use here I have made the subject-matter of a separate application and the same is prepared as indicated in that application. I mix and dissolve black albumin, which is dried blood, in water in the proportion of forty-five (45) per cent. of blood to fifty-five (55) per cent. of water by weight and stir the same to dissolve the said black albumin as fully as it is possible to do it at the usual atmospheric temperature of a room at, say, about 70°. I place this material in a suitable stirring apparatus so that the same is stirred very thoroughly and continuously for several hours, usually about six hours. This insures as complete solution of black albumin or blood in the water as is possible to accomplish at the temperatures indicated and makes a homogeneous mixture.

In place of taking the dried blood, fresh blood may be used by a proper degree of evaporation to get the required consistency, or the required consistency may be secured by admixing with the fresh blood a quantity of the dried blood and mixing the same in the same manner and to the same extent as the dried blood is mixed with water as above indicated.

I mix this blood preparation with a heavy grade of silicate of soda in the proportion by weight of five parts of dried blood to one part of silicate of soda solution. The silicate of soda solution is comparable to No. 14 as manufactured and marketed by the Gasselli Chemical Company of Cleveland, Ohio, and analysis of such solution shows that the same contains forty-four (44) per cent. of commercial disodium silicate. Apparently reaction takes place between these ingredients. I stir and mix the same thoroughly until the mixture has an appearance similar to heavy molasses.

Where fresh blood is used it may be kept in condition for use by refrigeration and also a very small quantity of boracic acid may be added as a preservative. Boracic acid is the preservative that I prefer to use. No preservative is necessary if the materials are used while fresh, and I have no doubt that other preservatives than boracic acid can be made use of, but I find that that apparently in no way interferes with the quality of the material.

In using this cement it is applied to veneers in the usual way and the veneer is then subjected to a strong heat and pressure, by hydraulic pressure preferably, the heat being substantially at or above the boiling point of water, and is secured by the introduction of steam into the members of the press.

The material when applied and the veneer made from it is of such quality that the cemented veneer can afterward be boiled and molded to shape as desired. Veneer made with this material may be boiled in water indefinitely without injury. I have boiled samples continuously for four months without injury.

While this cement is of especial use in the making of laminated lumber, I desire to state that it can be used for a variety of purposes, it being necessary, however, to apply heat and pressure substantially as indicated to secure a proper joint and the proper transformation of the cement in use. For instance, it might be made use of in applying a layer of wood to canvas backing or layers of wood to canvas or textile material for various purposes; or for the securing of indurated fiber that has been properly prepared and is in condition to be treated or wood to fiber and the like. I have indicated the uses of my cement so far as I am able, but believe that it is capable of many other uses than those which I have indicated.

I have indicated the precise strength of the blood solution that secures maximum results; viz., a forty-five (45) per cent. of solid blood content and fifty-five (55) per cent. of water. By taking pains it has been possible to make a solution of fifty (50) per cent. blood and fifty (50) per cent. water, but it is too viscous for ready manipulation with the usual tools of the trade, and great pains is required to secure proper and effective application. The higher the blood content the stronger the cement, and I have found by experimentation that the solution can be handled and produce a less strong but quite satisfactory joint with a solution of thirty (30) per cent. solid content of blood to seventy (70) per cent. of water. Even lower than this can be used but with a weakened joint.

The ratio of silicate to the blood should be maintained at five parts by weight solid blood content to one part solution of silicate; or to figure the solid content at the ratio of 11⅓ of solid blood content to 1 of dry disodium silicate by weight. There is slight variation possible from these proportions but to secure the thickening or syrupy effect the proportions of blood to silicate cannot be much varied. If a little too much silicate is added, the mixture is thin and not syrupy; and also if there is not enough silicate to insure proper reaction with the blood content, the material still remains thin. There is possible a comparatively small variation from the ratio I have indicated of 11⅓ parts by weight of dried blood to 1 part by weight of the dry disodium silicate. It will be noted, therefore, that eight and eight-tenths (8.8) per cent by weight of dry disodium silicate is added. That is to say, for every one hundred pounds of the dried blood there is added eight and eight-tenths pounds of dry disodium silicate, if the measures are made with accuracy, and this makes about eight per cent of the mixture dry disodium silicate. To work out the problem complete,—if we take 100 pounds of blood solution, 45% of this, or 45 lbs., will be the dried blood. To this is added one-fifth of the weight of the blood, this is, one-fifth of 45 lbs. or 9 lbs., of silicate of soda solution. This silicate of soda solution is 44% dry disodium silicate, and consequently contains 3.96 lbs. of dry disodium silicate and 5.04 lbs. of water. The entire mixture therefore consists of 60.04 lbs. of water, 45 lbs. of dried blood, and 3.96 lbs. of dry disodium silicate, making a total of 109 lbs. Potassium silicate has been found to be the equivalent of sodium silicate in this behalf, these chemicals being known under the group name of water-glass.

In using this cement with wood veneer, I preferably employ it in a three-ply veneer and usually the outer layers of veneer have been of rotary cut birch and the middle ply, which is disposed with the grain transverse thereto, is of spruce, and preferably the meeting surfaces of the wood are left in the condition in which they come from the veneer cutters, whether the same be saws or rotary cutters, without any sanding or smoothing. The middle ply of the veneer without any special preparation is completely covered by the cement by means of glue-distributing rolls and the same is disposed between the outside layers of the veneer which are merely air dried and passed through a hydraulic press the members of which are steam heated to substantially the boiling point of water. While the layers are still in apparently moist condition, heavy pressure and heat is thus applied which at once causes the cement material to set and retain the plies firmly in position with a substantial layer of the cementitious material between. Large continuous sheets of the veneer are prepared by advancing the same step by step to the heated hydraulic press, the veneer being completed by being subjected to pressure and for approximately 5 to 12 minutes according to the thickness of material used.

The veneer sheet that is thus prepared may be prepared for use much the same as sheet metal. It may be cut and the same can then be boiled or otherwise thoroughly moistened and heated and can be placed in steam heated forms or dies much as sheet metal is placed in dies and stamped and formed. Suitable provision is made for the escape of the steam and for retaining the sheets in the form until comparatively dry. The molds or dies should be designed to properly compress and upset the fibers of the wood when it will be found that the parts can be shaped for canoe bodies, for aeroplane wings, for automobile bodies, or any desired form within quite wide limits. Concavo-convex parts may be quite readily formed and bended parts can be made having quite abrupt angles. The forms may be heated by steam, electricity or otherwise.

While I have applied the invention particularly to veneer, as above indicated, I am aware that it is applicable to all kinds of veneers and laminated lumber.

I have indicated the treatment which is successful and preferred for making laminated lumber having a redwood core with birch outside. Experience demonstrates, however, that a somewhat different treatment is necessary with poplar or wood of that character which is spongy and very readily penetrated by moisture. For such absorbing wood I use the cement preparation as viscous and thick as it can be conveniently handled, and apply a very thin layer to each of the surfaces that are to be joined, and permit the same to partially air dry before bringing the surfaces into contact. I then apply the high pressure and heat and by this means maintain the cement at the joint and prevent it being unduly dissipated into the veneer. It is the object of both methods to secure a substantial layer of cement between the sheets of veneer to be converted by the heat and pressure and be brought intimately in contact with the surfaces, but I find that it is necessary to take pains to prevent the cement material being absorbed too deeply into the lumber.

In this behalf experience has demonstrated to me that the laminated material made up of wood with my cementitious material has special qualities, the cement being of such a character that it causes the upsetting of the fibers of the wood when the same is being molded, and I desire to claim the same especially in a multiply lumber of wood. I have, however, made use of the same to some extent for retaining other laminated materials together, and as the material is treated in situ and the cement as applied is entirely different from the cement after it has been treated in situ, I feel that a claim to laminated materials generally should be considered. I feel this fact is demonstrated when it is considered that the material is not soluble in either hot or cold water. I therefore desire to claim the same broadly and specifically, as indicated in the appended claims.

Having thus described my invention, what I claim as new and desire to secure by Letters Patent is:

1. The process of preparing and applying a cement consisting of dissolving black albumin (dried blood) in water in proportions of about 55 parts of water to 45 parts of albumin, mixing thoroughly for several hours, adding thereto a heavy grade of disodium silicate in the proportion of about 9 per cent. by weight to the albumin, mixing the same until the same have reached a homogeneous syrupy consistency, applying the same to wood surfaces of veneer to be joined, and applying pressure and heat to substantially the boiling point of water until the cement has set, as specified.

2. The process of preparing and applying a cement consisting of dissolving black albumin (dried blood) in water in proportions of about 55 parts of water to 45 parts of albumin, mixing thoroughly for several hours, adding thereto a heavy grade of disodium silicate in the proportion of about 9 per cent. by weight to the albumin, mixing the same until the same have reached a homogeneous syrupy consistency, applying the same to wood surfaces of veneer to be joined, and applying pressure and heat to substantially the boiling point of water until the cement has set, boiling the said laminated wood in water until the whole is thoroughly heated and moistened and then conforming the same in molds heated substantially to the boiling point of water, and drying the same in molds, as specified.

3. The process of preparing and applying a cement consisting of dissolving black albumin (dried blood) in water in proportions of about 55 parts of water to 45 parts of albumin, mixing thoroughly for several hours, adding thereto a heavy grade of disodium silicate in the proportion of about 9 per cent. by weight to the albumin, mixing the same until the same have reached a homogeneous syrupy consistency, applying the same to wood surfaces of veneer to be joined, and applying pressure and heat to substantially the boiling point of water until the cement has set, boiling the said laminated wood in water until the whole is thoroughly heated and moistened and then conforming the same in molds heated substantially to the boiling point of water, as specified.

4. The process of preparing and applying a cement consisting in adding to a solution of blood albumin a heavy grade of disodium silicate in the proportion of about 9 per cent. by weight to the albumin, mixing the same until the same have reached a homogeneous syrupy consistency, applying the same to wood surfaces of veneer to be joined, and applying pressure and heat to substantially the boiling point of water until the cement has set, as specified.

5. The process of preparing and applying a cement consisting in adding to a solution of blood albumin a heavy grade of disodium silicate in the proportion of about 9 per cent. by weight to the albumin, mixing the same until the same have reached a homogeneous syrupy consistency, applying the same to wood surfaces of veneer to be joined, and applying pressure and heat to substantially the boiling point of water until the cement has set, boiling the said laminated wood in water until the whole is thoroughly heated and moistened and then conforming the same in molds heated substantially to the boiling point of water, and drying the same in molds, as specified.

6. The process of preparing and applying a cement consisting in adding to a solution of blood albumin a heavy grade of disodium silicate in the proportion of about 9 per cent. by wegiht to the albumin, mixing the same until the same have reached a homogeneous syrupy consistency, applying the same to wood surfaces of veneer to be joined, and applying pressure and heat to substantially the boiling point of water until the cement had set, boiling the said laminated wood in water until the whole is thoroughly heated and moistened, and then conforming the same in molds heated substantially to the boiling point of water, as specified.

7. Process of preparing and applying cement consisting of dissolving black albumin in water, adding thereto disodium silicate, mixing the same until the mixture is homogeneous in substantially the proportions specified, applying the same to surfaces to be joined, and applying heat and pressure to set the same, as specified.

8. Process of preparing and applying cement consisting of dissolving black albumin in water, adding thereto disodium silicate, mixing the same until the mixture is homogeneous in substantially the proportions specified, applying the same to surfaces to be joined, and applying heat and pressure to set the same, thereafter boiling the laminated wood to completely soften and heat its texture and molding the same under heat and pressure to desired forms.

9. A material consisting of plies of veneer joined together by a cement bond comprising black albumin and disodium silicate intimately admixed and joined together, and set by the application of heat and pressure and insoluble in either cold or hot water.

10. A material made up of plies or layers joined together by a cement bond comprising black albumin and disodium silicate intimately admixed and set by heat and pressure and insoluble in either cold or hot water.

11. A material made up of plies or layers joined together by a cement bond comprising black albumin and disodium silicate intimately admixed and set by heat and insoluble in either cold or hot water.

12. A material, an article of manufacture made up of plies or layers of wood joined together by a cement bond comprising black albumin and disodium silicate intimately mixed and set by heat and conformed and molded to shape and insoluble in either cold or hot water.

13. A material, an article of manufacture made up of plies or layers joined together by a cement bond comprising black albumin and disodium silicate intimately mixed and set by heat and conformed and molded to shape, and insoluble in either cold or hot water.

14. A material, an article of manufacture made up of plies or layers of wood joined together by a cement bond comprising black albumin and disodium silicate in the proportion of 8% of disodium silicate to 92% of albumin, intimately mixed and set by heat and conformed and molded to shape, and insoluble in either cold or hot water.

15. A material, an article of manufacture made up of plies or layers joined together by a cement bond comprising black albumin and disodium silicate in the proportion of 8% of disodium silicate to 92% of albumin, intimately mixed and set by heat and conformed and molded to shape, and insoluble in either cold or hot water.

16. Process of preparing and applying cement consisting of dissolving black albumin in water, adding thereto water glass, mixing the same until the mixture is homogeneous in substantially the proportions specified, applying the same to surfaces to be joined, and applying heat and pressure to set the same, as specified.

17. A material made up of plies or layers joined together by a cement bond comprising black albumin and water glass intimately admixed and set by heat and pressure and insoluble in either cold or hot water.

In witness whereof, I have hereunto set my hand and seal in the presence of two witnesses.

HENRY L. HASKELL. [L. S.]

Witnesses:
  LUELLA G. GREENFIELD,
  MARGARET L. GLASGOW.

Certificate of Correction.

It is hereby certified that Letters Patent No. 1,516,566, granted November 25, 1924, upon the application of Henry L. Haskell, of Ludington, Michigan, for an improvement in "Laminated Material and the Process of Preparing Same," were erroneously issued to "Haskelite Manufacturing Corporation, of Grand Rapids, Michigan, a Corporation of Michigan," as assignee of the entire interest in said invention, whereas said Letters Patent should have been issued to the inventor, *said Haskell*, as sole owner of said invention, as shown by the records of assignments in this office; and that the said Letters Patent should be read with this correction therein that the same may conform to the record of the case in the Patent Office.

Signed and sealed this 27th day of January, A. D. 1925.

[SEAL.]

KARL FENNING,
*Acting Commissioner of Patents.*